United States Patent [19]
Galbraith, Jr.

[11] 3,952,317
[45] Apr. 20, 1976

[54] CAMERA SHUTTER

[75] Inventor: Floyd M. Galbraith, Jr., Rochester, N.Y.

[73] Assignee: Eastman Kodak Company, Rochester, N.Y.

[22] Filed: Mar. 19, 1975

[21] Appl. No.: 559,938

[52] U.S. Cl. .................................. 354/48; 354/246
[51] Int. Cl.² ...................... G03B 9/40; G03B 9/62; G03B 7/08
[58] Field of Search ................. 354/48, 50, 51, 246, 354/252

[56] References Cited
UNITED STATES PATENTS

| | | | |
|---|---|---|---|
| 3,479,935 | 11/1969 | Harvey | 354/50 |
| 3,670,636 | 6/1972 | Holle | 354/34 |
| 3,705,536 | 12/1972 | Lermann | 354/51 |
| 3,709,113 | 6/1973 | Wood | 354/34 |
| 3,829,877 | 8/1974 | Kitai | 354/246 |
| T922,009 | 5/1974 | Alessi | 354/51 X |

Primary Examiner—Joseph F. Peters, Jr.
Attorney, Agent, or Firm—J. L. Palmer

[57] ABSTRACT

A camera shutter has opening and closing blades mounted to be sequentially moved to effect exposure of film in the camera. The opening blade moves to permit an exposure to begin and the closing blade is retained, by a light responsive electromagnetic circuit, in a position to permit the exposure to continue for a duration related to scene brightness. An armature, controlled by the electromagnetic circuit, engages the closing blade and is engaged by the opening blade throughout a portion of its opening movement, thus preventing release of the closing blade prior to the opening blade reaching a preset position in its movement. In the event that the electromagnet is inoperative, the delay of the closing blade is determined by the time that the opening blade engages the armature.

5 Claims, 5 Drawing Figures

CAMERA SHUTTER

BACKGROUND OF THE INVENTION

1. Field of the Invention

This invention relates to an electronic shutter for use in a camera and in particular to a shutter in which a movable electromagnetic armature cooperates with an opening and a closing shutter blade to effect an electronically controlled, variable exposure duration and a mechanically controlled minimum exposure duration.

2. Discussion of the Prior Art

Camera shutter mechanisms are provided in the prior art which include two blades that are slidably mounted and moved in sequence to effect exposure. The opening blade is released to begin exposure and the closing blade is electromagnetically delayed for an interval related to scene brightness, whereafter the closing blade is released to terminate exposure. The electromagnetic delay is generally provided by an electromagnetic latch which includes an electromagnet and an armature movable in response thereto, which latches the closing blade as long as the electromagnet is energized. If the electromagnet should fail to operate because, for example, of the failure of the power supply, both blades will move simultaneously, and will not uncover the exposure aperture for an interval sufficient to provide an acceptable photographic exposure. Some shutter mechanisms correct this deficiency by employing, in addition to an electromagnet delay device, an inertial-retard device that operates after release of the closing blade to retard its movement for a predetermined minimum exposure interval. Other shutter mechanism includes a movable stop that engages the closing blade and which is released by the opening blade after initial movement thereof.

While these corrective measures insure at least a minimum exposure interval, these measures complicate the camera construction and require at least one additional operating element that is also subject to mechanical failure. The present invention minimizes additional elements by utilizing the opening shutter blade and the armature as a detent for holding the closing blade for a preset time in relation to the movement of the opening blade. Thereby the release of the electromagnet latch is prevented for a predetermined time and thus an exposure of fixed duration is produced.

SUMMARY OF THE INVENTION

Therefore, an object of this invention is to provide an improved arrangement mechanically to effect an exposure of minimum duration in an electronic shutter camera.

A further object of the invention is to provide improved apparatus that produces an exposure of fixed duration for a two-blade shutter.

Still another object of this invention is to combine a blade-retard function with an electromagnetic latch function.

These and other objects are attained in a shutter of the type in which a first blade moves to open an exposure aperture and a second blade subsequently moves to close the exposure aperture to terminate the exposure. An actuatable electromagnetic latch, when energized, retains the second blade in its exposure position for an interval related to scene brightness, and when de-energized releases the latch to permit movement of the second blade. The first blade also engages the latch throughout a predetermined portion of the first blade's movement and prevents releasing movement of the latch until the opening blade reaches a preset position relative to the exposure aperture; movement of the second blade is thus prevented until a preset time after the opening blade moves. When the electromagnetic latch is inactive, release of the latch by the first blade permits the second blade to move to terminate the exposure. An exposure of fixed duration is established by the length of time that the first blade engages the latch.

BRIEF DESCRIPTION OF THE DRAWINGS

The invention, its objects and advantages, will become more apparent in the detailed description of the preferred embodiment presented in conjunction with the accompanying drawings, in which.

DETAILED DESCRIPTION OF THE PREFERRED EMBODIMENTS

Because photographic cameras are well known the present description is directed in particular to elememts forming part of, or cooperating more directly with, the present invention, camera elements not specifically shown or described are understood to be selectable from those known in the art.

Figure 1:
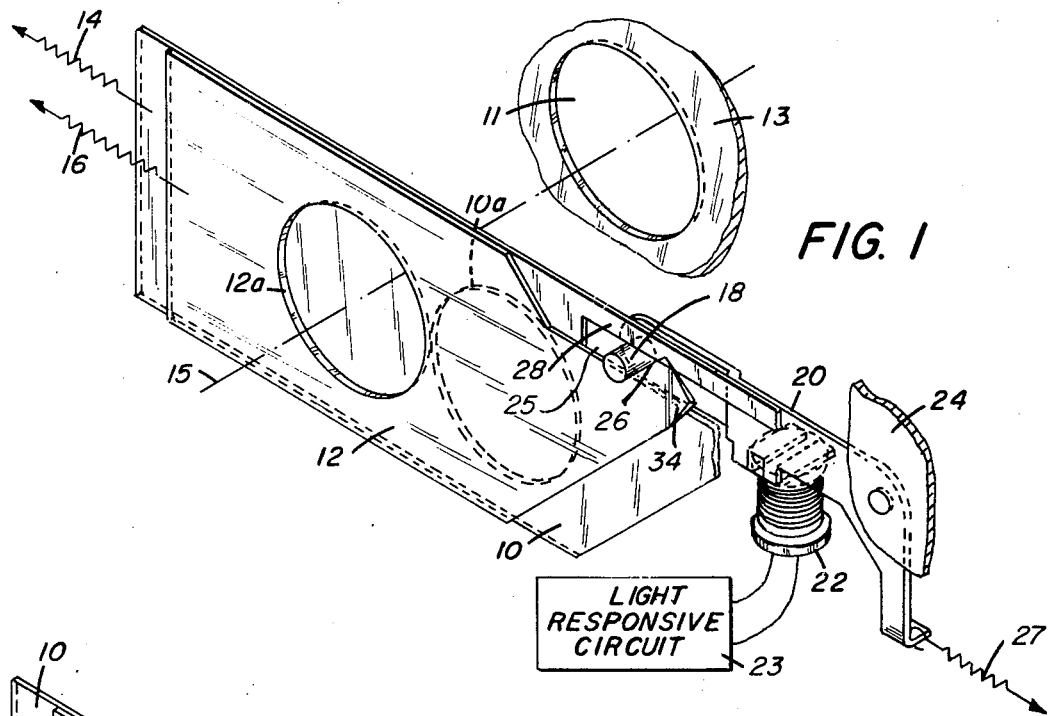
FIG. 1 is a perspective view of a two-blade shutter mechanism in its cocked position.

Referring first to FIG. 1, there is shown a shutter of the type having an opening shutter blade 10 and a closing shutter blade 12, each of which is slidably mounted and juxtaposed for sequential movement to effect exposure of film (not shown) in a camera. A fixed exposure aperture 11 is aligned with a lens axis 15 and formed in the shutter housing, a part of which housing is shown at 13. The blades 10, 12 contain apertures 10a and 12a respectively that cooperate with the exposure aperture 11 to permit exposure of film therethrough. In the cocked position of FIG. 1, the aperture 12a of closing blade 12 is positioned in its light unblocking position with respect to the exposure aperture 11 but an opaque portion of the opening blade 10 is positioned overlying the apertures 11 and 12a. The opening blade 10 is held in the cocked position against the biasing tension of a spring 14 by a release mechanism, not shown, but which may be any of the types well known in the art.

The closing blade 12 is retained in the cocked position, against the biasing tension of a spring 16, by a pin 18 on an armature 20 that is a movable element of an electromagnet 22. The armature 20 is operative with a light responsive circuit 23, which, for example, may be the type circuit disclosed in commonly assigned U.S. Pat. No. 3,748,974 issued July 31, 1973 to Todd D. Cochran. The disclosure in the Cochran patent is incorporated herein by reference. The armature 20 is pivotally mounted to a support 24 for movement between an active position shown in FIG. 1 and an inactive position shown by the dotted lines in FIG. 2. The armature 20 is urged by a spring 27 into its active position so as to engage the electromagnet 22; the electromagnet 22 together with the armature 20 operates as an electromagnetic detent or latch device. In the active position the pin 18 is located within a cut away portion 25 of the blade 12 and engages a cam surface 26 of the blade 12 to latch blade 12 in its light unblocking position. In this position, a tail 28 of the blade 10 also engages the pin 18, thus the pin 18 is captured between the cam surface 26 and the tail 28. In the inactive position of the armature 20, the tail 28 releases the pin 18 and the pin 18 becomes totally disengaged from the closing blade 12 after the electromagnet 22 de-energizes, thereby permitting movement of blade 12 to its light blocking position, as shown in phantom in FIG. 2.

Figure 2:
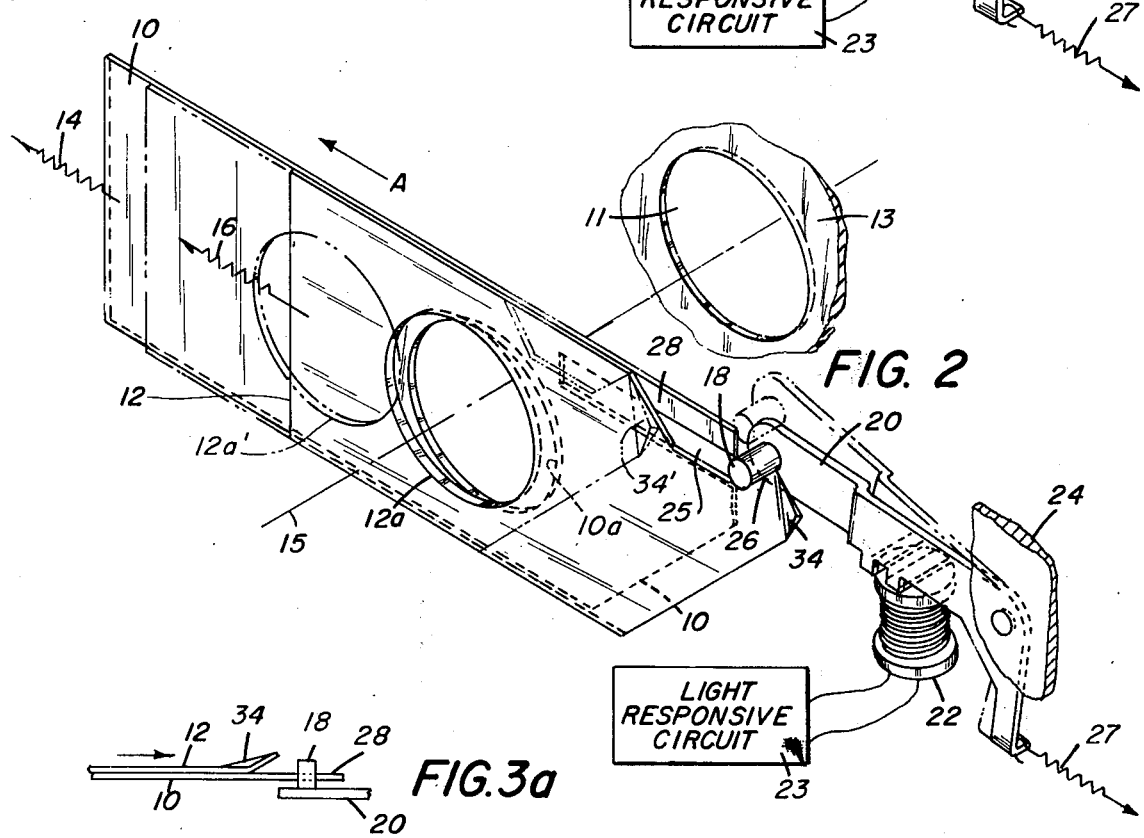
FIG. 2 is a perspective view of the shutter mechanism of FIG. 1 after a first blade has moved to open an exposure aperture and a second blade is released to move to terminate the exposure.

In operation, actuation of a shutter release (not shown) actuates the circuit 23 which energizes the electromagnet 22, and releases the blade 10 for movement in the direction of arrow A to its light unblocking position (FIG. 2). This movement continues until the aperture 10a is aligned with the aperture 12a so as to effect exposure of film through exposure apertures 11, 10a and 12a. Coincident with partial alignment of the apertures 10a and 12a, as illustrated in FIG. 2, the tail 28 becomes disengaged from the pin 18. Since the electromagnet 22 is, as stated, energized, by the control circuit 23, the armature 20 will be maintained in a position to retain the pin 18 in engagement with the cam surface 26 for a period related to scene brightness. At the proper interval following initiation of exposure, the electromagnet 22 becomes de-energized by the operation of the circuit 23. The pin 18 is now permitted to move along the cam surface 26 as the blade spring 16 moves the closing blade 12 in the direction of arrow A. Thus the force of movement of the blade 12 cams the armature 20 to its inactive position, shown by the dotted lines in FIG. 2, and the pin 18 clears the cam surface 26. Thereupon the blade 12 rapidly moves to its light blocking position to terminate the exposure by displacing the aperture 12a to the position shown by dotted lines in FIG. 2.

If the electromagnet 22 does not become energized, for example due to failure of the battery power supply, or faulty operation of the electromagnet, or scene brightness requires an exposure duration equivalent to the minimum shutter speed, the fixed minimum exposure interval will result. The minimum exposure interval is directly related to the time necessary for the blade spring 14 to move the opening blade 10 the distance required to disengage the tail 28 from the pin 18. When the tail 28 is free of the pin 18, movement of the closing blade 12 in direction A commences and causes the pin 18 to ride up the cam surface 26 until the pin 18 clears the surface. The shutter then closes as previously described. The length of the tail 28 may be increased or decreased to permit increased or decreased delay in release of the armature 20, and thus increased or decreased delay in release of the blade 12 relative to release of the blade 10. The time required to move the armature 20 should be substantially smaller than the time interval that the tail 28 engages the pin 18, so that the delay is substantially equal to the time during which the tail 28 is in engagement with the pin 18. The delay may be in the order of 1/500 sec., and, in normal operation, is part of any delay that results from the blade 12 being held by the energized electromagnet 22. However, in the event that the electromagnet 22 is inoperative, the delay provided by the tail 28 is the minimum exposure interval provided by the camera.

Figure 3A:
FIGS. 3a, 3b and 3c show the manner in which the second blade is cocked relative to an armature latch.
Figure 3B:
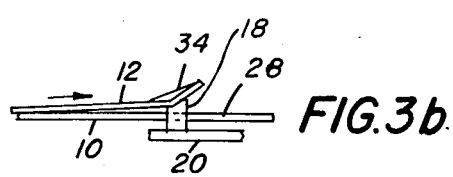
Figure 3C:
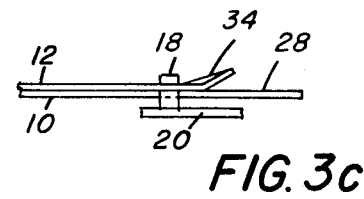

For cocking, the apparatus relies upon the flexibility of the blade 12 and an upturned, oblique projection 34 located thereon. As shown in FIGS. 1 and 2, the cam surface 26 is located at the end of the blade 12, and the projection 34, beyond the cam surface 26, is bent obliquely to the plane of the blade 12 and away from blade 10. When the apparatus is being cocked as shown in FIGS. 3a–c, i.e., the blades 10, 12 are being moved to the right, the armature 20 occupies the position shown in FIG. 1 and the pin 18 is positioned in the path of the movement of the oblique projection 34. As can be seen in FIGS. 3a, 3b and 3c, the projection 34 engages the pin 18 during this movement and forces the end of the blade 12 to bend very slightly (see FIG. 3b). As the blade 12 continues to move, the projection 34 slides up and over the pin 18 until the cam surface 26 passes the pin 18. Then projection 34 snaps back to its usual position closely adjacent blade 10 as shown in FIG. 3c. During cocking movement of the closing blade 12, pin 18 enters the space between the tail 28 of the opening blade 10 and a cut-away portion 25 of blade 12 so that blade 10 engages the pin 18 and retains the armature 20 in the position shown in FIG. 1, thereby preventing its pivotal movement.

Thus, it will be seen from the foregoing that an armature, normally used as part of an electromagnetic delay device for a closing blade, cooperates with the opening blade to provide a preset delay in the movement of the closing blade. When the camera battery is inoperative, the camera always operates at the fastest fixed shutter speed established by the time the opening blade 10 retains the electromagnetic latch in its active position. It is important to note that the invention basically involves the cooperation of the opening blade 10 and the tail 28 formed thereon, the closing blade 12 and the cam surface 26, and the electromagnetic latch or detent which includes the spring biased armature 20 and the pin 18. It should be understood that in the absence of the electromagnet 22 this shutter device will operate as a mechanical shutter.

The invention has been described in detail with particular reference to a preferred embodiment thereof, but it will be understood that variations and modifications can be effected within the spirit and scope of the invention.

I claim:

1. In a camera, shutter apparatus comprising:
   latch means mounted for movement between an active and an inactive position;
   means for urging said latch means into said active position;
   a first blade mounted for movement between light blocking and unblocking positions and including means located relative to said latch means for retaining said latch means in said active position during a predetermined portion of movement of said first blade toward said light unblocking position;
   means for urging said first blade toward said light unblocking position;
   a second blade mounted for movement between light unblocking and blocking positions, including means for moving said latch means toward said inactive position during movement of said second blade toward said light blocking position; and
   means for urging said second blade toward said light blocking position.

2. In a camera, shutter apparatus comprising:
   a detent mounted for movement between an active and an inactive position;

means for urging said detent toward said active position;

electromagnetic means, operative with said detent, for retaining said detent in said active position during an energized state thereof and being de-energizable for permitting said detent to be moved toward said inactive position;

a first blade mounted for movement between light blocking and unblocking positions;

means, on said first blade, for retaining said detent in said active position for a predetermined portion of movement of said first blade toward said light unblocking position;

means for urging said first blade toward said light unblocking position;

a second blade mounted for movement between light unblocking and blocking positions, and including means engaging said detent for moving said detent toward said inactive position during movement of said second blade toward said light blocking position; and means for urging said second blade toward said light blocking position.

3. Apparatus as claimed in claim 2 wherein said detent moving means comprises a cam on said blade, said cam engaging said detent for the imparting momentum from said moving blade to said detent.

4. A shutter as claimed in claim 2 wherein said first blade means is an extension of said first blade and positioned to engage said detent during movement of said first blade to prevent movement of said detent toward said inactive position until said blade moves a predetermined distance.

5. In a camera, shutter apparatus comprising:

a first shutter blade mounted for movement between a light blocking position and a light unblocking position to initiate an exposure;

means for urging said first blade toward light unblocking position;

a second blade mounted for movement between a light unblocking and a light blocking position to terminate exposure;

means for urging said second blade toward said light blocking position;

a detent mounted for movement between an active position in which said detent engages said first and second blades and an inactive position in which said detent disengages from said first and second blades;

light responsive electromagnetic means for urging said detent toward an active position and for releasably retaining said detent in said active position for a duration related to scene brightness;

means included on said first blade for retaining said detent in said active position during a predetermined portion of movement of said first blade toward said light unblocking position; and means included on said second blade for engaging said detent when in said active position to prevent movement of said second blade when said detent is retained in said active position by said electromagnet means and for moving said detent toward said inactive position in response to movement of said second blade, after said detent is released by said electromagnetic means.

* * * * *